United States Patent [19]

Schneekluth

[11] 3,996,877
[45] Dec. 14, 1976

[54] SHIP PROPELLER ARRANGEMENT

[75] Inventor: Herbert Schneekluth, Aachen, Germany

[73] Assignee: Schottel-Werft Josef Becker KG, Spay (Rhine), Germany

[22] Filed: July 31, 1975

[21] Appl. No.: 600,861

[30] Foreign Application Priority Data

Aug. 8, 1974 Germany .......................... 2438147

[52] U.S. Cl. ................................................ 115/37
[51] Int. Cl.² ........................................ B63H 5/08
[58] Field of Search ........ 115/34 R, 35, 37, 18 A, 115/42; 114/16 E, 16 R, 151, 57

[56] References Cited

UNITED STATES PATENTS

| 53,840 | 4/1866 | Liburn | 115/37 |
| 337,479 | 3/1886 | Clark | 115/37 |
| 2,314,370 | 3/1943 | Rietzke | 115/37 |
| 3,162,169 | 12/1964 | Ferris | 115/37 |
| 3,838,654 | 10/1974 | Haas | 114/16 R |

FOREIGN PATENTS OR APPLICATIONS

| 435,946 | 5/1948 | Italy | 115/37 |
| 12,746 | 6/1893 | United Kingdom | 115/37 |
| 387,826 | 2/1933 | United Kingdom | 115/37 |

Primary Examiner—Trygve M. Blix
Assistant Examiner—Jesus D. Sotelo
Attorney, Agent, or Firm—Woodhams, Blanchard and Flynn

[57] ABSTRACT

Propeller arrangement for marine vessels. A small supplemental and independently drivable propeller is mounted for swivelling in a horizontal plane and is preferably positioned in fore-and-aft alignment with at least one main propeller and slightly above same. Preferably the supplemental propeller is positioned ahead of such main propeller a distance equal to at least three-quarters of the diameter of the blade tip circle of the supplemental propeller. The blade tip circle of the supplemental propeller, when projected onto a common transverse plane may lie wholly within the correspondingly projected blade tip circle of the main propeller or it may extend partially out therefrom. The arrangement is adaptable to a variety of specific propeller arrangements including offsetting or angularly positioning the thrust line of the main propeller to counteract the turning moment of propeller torque and is further adaptable for use with single or multiple screw vessels. The supplemental propeller is adaptable primarily for harbor maneuvering and is of design appropriate to low speed operation as distinguished from the higher speed operation of the main propeller. In addition the supplemental propeller can increase the mean operation speed.

7 Claims, 6 Drawing Figures

SHIP PROPELLER ARRANGEMENT

FIELD OF THE INVENTION

The invention relates to an arrangement of at least one supplemental propeller in addition to at least one main propeller in ships or other floating or diving devices.

BACKGROUND OF THE INVENTION

In ships having the usual shape with a single main propeller, the flow to the main propeller is often somewhat uneven. This uneven inflow can produce vibrations in the propeller and drive system. It is also possible to generate vibrations in the hull, commencing with the plating of such hull located above the main propeller, namely in the area of the counter. Further, the individual blades of the propeller can generate vibrations. The unevenness of the propeller inflow also acts to diminish the propeller efficiency.

It is known to oppose these actions by a special shape of the ship's hull, through low friction flow surfaces or through additional propellers in the flow stream.

It is also known to arrange a control propeller behind the main propeller pivotable with the rudder. This, however, increases the unevenness of the flow stream and serves solely to improve control.

It is also known to arrange a supplemental propeller in relation to the direction of travel closely in front of the upper portion of the main propeller. In such an arrangement, however, the low pressure zone of the main propeller and the high pressure zone of the supplemental propeller adversely influence one another and this results in a considerable loss of efficiency. Also it is not possible to use this additional propeller as a control assist inasmuch as in the known arrangements, the direction of rotation of the two propellers is opposite.

Finally it is known to arrange a supplemental propeller pivotally about a vertical axis and in the direction of travel behind the main propeller and behind the rudder. The rudder has a suitable recess in its upper edge. Since this supplemental propeller lies in the flow stream of the main propeller, it must have a very high rotational speed to produce any additional propulsion when the main propeller operates, and the propeller blades must have a high pitch corresponding to the high inflow speed. This pivotable supplemental propeller can be used to maneuver, but for this purpose a small rotational speed and a low pitch for the propeller blades is needed. Therefore, it is possible to design this supplemental propeller either for a high service speed (flow stream of the main propeller) or for a smaller inflow speed during maneuver. For this reason, the known supplemental propeller has been arranged retractably and extendably, in order not to hinder the other propeller during a travelling condition. It would also be possible to equip the supplemental propeller with adjustable propeller blades. However, both measures, the extendability and the blade adjustability, are very expensive and especially so if the supplemental propeller is pivotable about a vertical axis for maneuvering purposes.

SUMMARY OF THE INVENTION

Therefore the basic purpose of the invention is the arrangement of a supplemental propeller, which on the one hand increases the propulsion efficiency factor of the main propeller and thereby effects a power savings and which on the other hand provides maneuvering assistance at a relatively small expense, said latter being obtained by eliminating the need for an adjusting mechanism for the propeller blades or a lowering mechanism for the supplemental propeller.

The basic purpose of the invention is attained by the supplemental propeller being arranged pivotally about a substantially vertical axis and drivable for this purpose and, in relationship to the direction of travel, being arranged in front of the main propeller in such a manner that the projections of the blade tip circles at least partially overlap each other on the cross-sectional transverse plane and that the distance of the blade tip circles of the main propeller and supplemental propeller is in longitudinal direction of the ship at least three-quarters of the diameter of the blade tip circles of the supplemental propeller. In this manner, the supplemental propeller is arranged in the zone of the lesser inflow speed of the main propeller, namely, sufficiently in front thereof that their respective pressure and suction zones lie far apart and a loss of efficiency through a reciprocal influence is avoided.

The invention reduces considerably all of the above-mentioned types of vibration and at the flow which usually in the propeller zone flows upwardly and inclinedly rearwardly, the combined jet cross section is greater than the total area of the projections of the two propellers. Furthermore, the supplemental propeller can be used as a maneuvering aid without need for the devices mentioned above as being disadvantageous. The supplemental propeller is driven independently from the main propeller. Thus it is possible to utilize minimum power during maneuvering, which power lies below the minimum output of the Diesel motor for the main propeller. The direction of rotation of the supplemental propeller of the invention can be chosen freely, a direction of rotation in the same direction as the main propeller being preferable in order to permit a partial torque recovery. The distance of the blade tips of the supplemental propeller from the counter may be less because of its smaller output than in the case of the main propeller. If the supplemental propeller lies closer to the counter, then the blade tip circles of main and supplemental propeller can intersect with the result that, as stated before, the entire jet cross section is enlarged and thus the theoretical efficiency is improved. Furthermore, the additional propeller operates substantially in the border layer of the hull plating of the ship, which effects an improvement in propulsion efficiency factor by recovering the energy which was lost through the hull plate friction.

With the arrangement of the invention it is also possible to permit the main propeller to operate a sufficient distance from the keel that in the case of a non-operating propeller or if the two lower propeller blades are symmetrical to the keel, they will not project below the keel line. The main propeller can be fixed in this "harbor position" and the ship can be driven by the supplemental propeller. This is a special advantage of the invention.

In order to cancel the torque action of the main propeller, which is created by the lateral components of the thrust of the upper and of the lower propeller blade being opposite, the invention is further developed so that the axis of the main propeller assumes such a position that the propeller thrust defines a moment about a vertical axis of the ship, which acts against the moment (turning action) carried out by the propeller rotation about the same axis.

It is possible to proceed herein in various ways. The arrangement of the invention can be such that the axis of the main propeller is arranged angularly with respect to the central longitudinal plane, namely either so that the center point of the blade tip circles of the main propeller lies in such plane or is offset laterally thereto. A different embodiment of the invention contemplates that the axis of the main propeller is arranged parallel but laterally offset with respect to the central longitudinal plane.

The additional propeller can thereby lie in the central longitudinal plane or can be offset laterally therefrom.

Since it is advantageous if the rudder can be attacked from both the front and the rear, the invention can be further developed by arranging the supplemental propeller in front of the rudder and the main propeller behind the rudder.

The invention can be further developed associating a supplemental propeller only with one port of the main propeller.

BRIEF DESCRIPTION OF THE DRAWINGS

The invention will be discussed in connection with exemplary embodiments, FIGS. 1 to 6.

DETAILED DESCRIPTION

Figure 1:
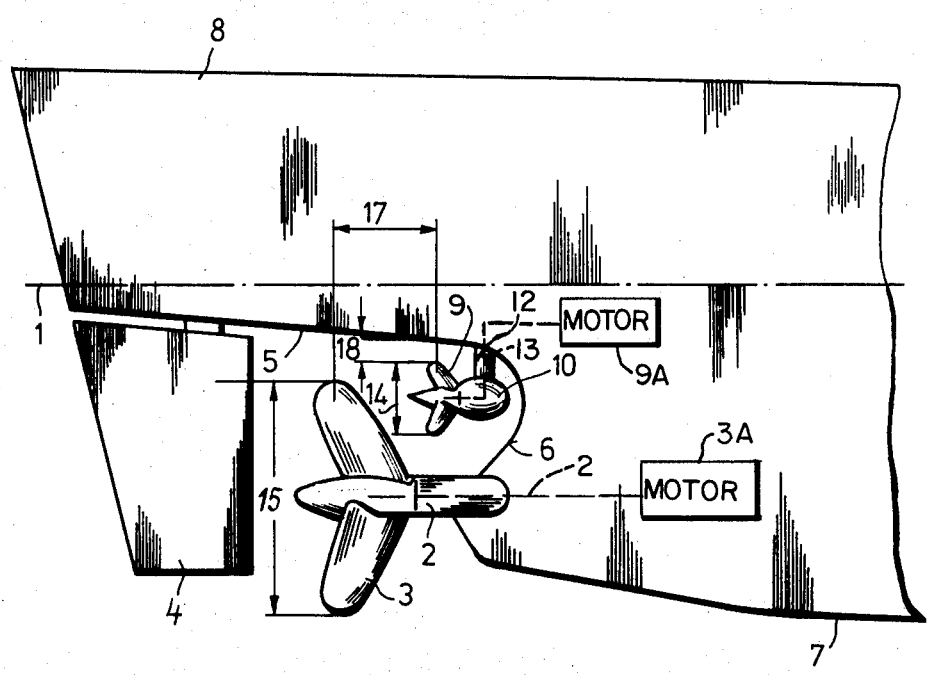
FIG. 1 illustrates the stern of a boat which is equipped with a supplemental propeller according to the invention.

FIG. 1 illustrates the stern of a ship 8. Reference numeral 7 identifies the keel of the ship, reference numeral 5 the counter and reference numeral 1 the water line. A main propeller 3 is arranged in front of a rudder 4 on the propeller post 6 and is driven by a motor 3A. In relation to the direction of travel, there is supported in front of the main propeller and above the propeller shaft 2 a supplemental propeller 9 in a housing 10. The housing is supported pivotally about a vertical axis by means of a neck 12 or the like in the rear of the ship and can be driven for this purpose by a not-illustrated motor. The arrangement can be such that the housing and thus the additional propeller can be pivoted through any desired angle up to 360°. The additional propeller 9 itself can be driven by a motor 9A which is also arranged in the ship through a drive shaft 13 and an angular drive, for example a bevel gearing. The diameter of the blade tip circle 14 of the supplemental propeller 9 is less than half the diameter of the blade tip circle 15 of the main propeller 3. Both blade tip circles are arranged in such a manner with respect to one another that they at least partly overlap and intersect in the projection on the cross-sectional transverse plane. Thus the blade tip circle 14 of the supplemental propeller is not entirely within that of the main propeller or, in other cases, the blade tip circle of the supplemental propeller may be entirely within the blade tip circle of the main propeller. The said blade tip circles are spaced at a distance 17 of at least three-quarters (0.75) of the diameter of the blade tip circle 14 of the supplemental propeller, which substantially avoids a reciprocal influencing of the pressure and suction zones.

The distance of the blade tip circle of a propeller from the counter, which distance is necessary to minimize vibration, is a function of the propeller diameter, of the power and of the shape of the ship. Generally in the case of ocean ships, the distance should be between 6% and 25% of the diameter of the propeller, so that heavy vibrations are not generated in the hull plating. Since the supplemental propeller has a smaller diameter and releases less power, the distance 18 of the propeller tip circle 14 from the counter 5 may be relative to the diameter of the supplemental propeller and in any case less than without the invention.

Figure 2:
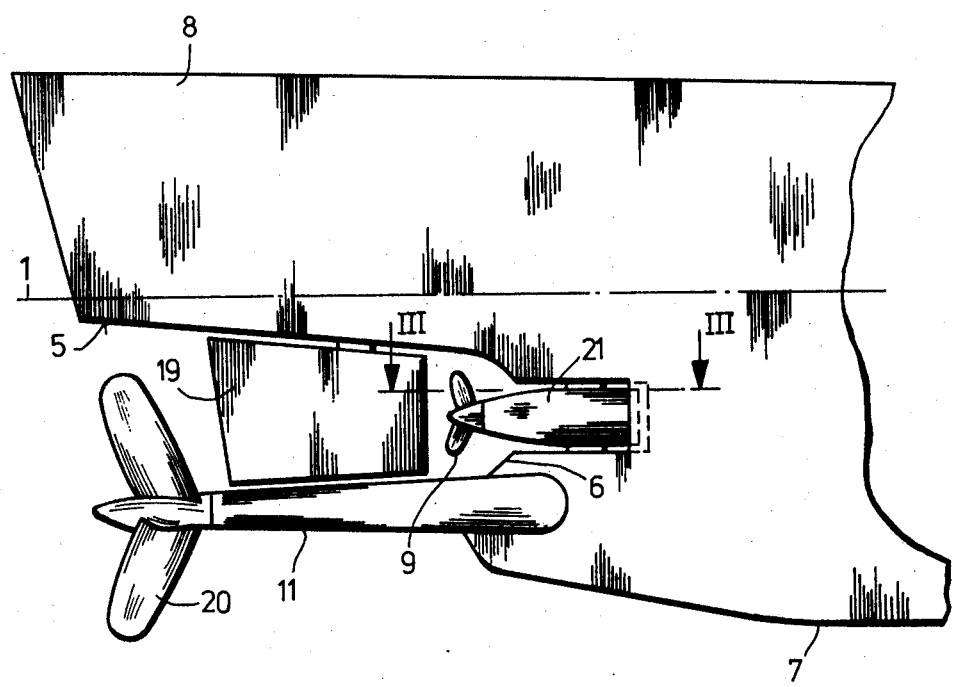
FIG. 2 illustrates an exemplary embodiment in which the supplemental propeller is arranged in front of the rudder and the main propeller is arranged behind the rudder.

In the embodiment according to FIG. 2, the supplemental propeller 9 is arranged in front of the rudder 19 and the main propeller 20 is arranged behind it, because it is advantageous if the rudder can be attacked from both ends. The housing 21 is mounted on the hull in such a manner that the hull water lines which are parallel on the hull plating to the water line 1, extend into the housing contour and meet at the rear edge of the gondola so that at a central longitudinal position of the supplemental propeller 9, the outflow of the hull water lines narrows down in the transition zone of the counter and propeller post. It is possible for the housing surface to adjust in other suitable ways to the hull shape of the ship in position, direction and curvature. The main propeller is supported within a suitable propeller shaft housing 11, which in this case is in a rearwardly projecting generally post-like housing.

Figure 3:
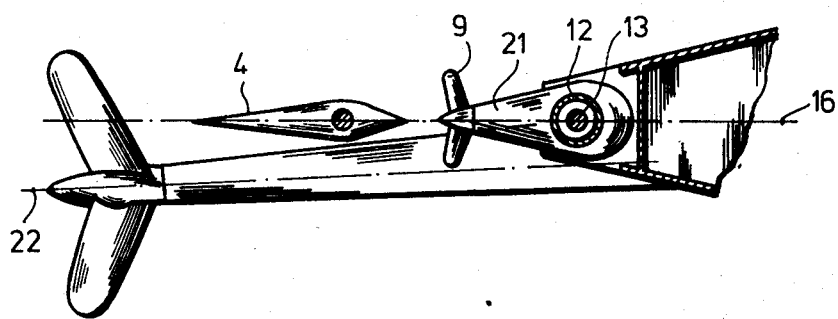
FIG. 3 is a cross-sectional view along the line III—III of FIG. 2 but including a modification that the shaft of the main propeller projects inclinedly rearwardly (exaggerated illustration).

FIG. 3 illustrates an embodiment of the invention in which the main propeller is supported such that the axis 22 of the shaft of the propeller is inclined at an angle with respect to the central longitudinal plane 16 and the propeller is offset with respect to said plane. This arrangement causes a lateral thrust, which cancels the torque of the propeller, namely the action of the different thrust components of the upper and of the lower propeller blades. This angle is advantageously 3° to 5°, however, it may if desired be smaller or larger.

Figure 4:
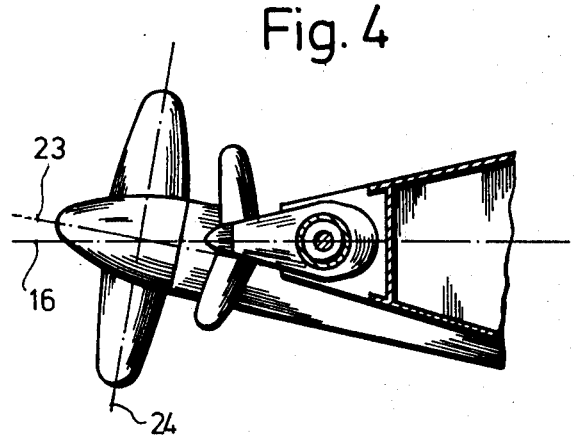
FIG. 4 illustrates an exemplary embodiment in which the main propeller lies in the central longitudinal plane, its axis, however, is arranged angularly with respect to such plane.

FIG. 4 illustrates an embodiment in which the propeller shaft is arranged such that the propeller axis 23 is inclined in such a manner to the central longitudinal plane 16, that the plane 24 placed through the blade tips extends through the point of intersection of the afore-mentioned plane and axis. This arrangement also will cancel the torque action of the propeller.

Figure 5:
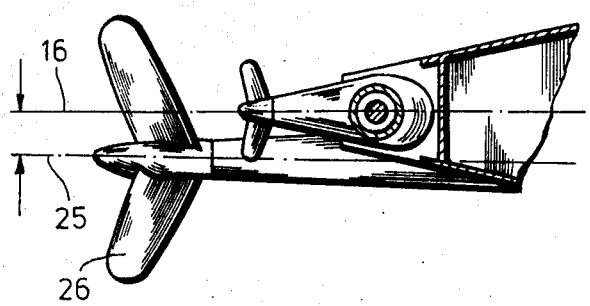
FIG. 5 illustrates an exemplary embodiment having a laterally offset main propeller, the shaft of which is arranged parallel to the central longitudinal plane.

In the embodiment according to FIG. 5 the axis 25 of the propeller 26 is offset but parallel to the central longitudinal plane 16 for the same purpose. The supplemental propeller can still further, if desired, be arranged in the central longitudinal plane or in a plane placed through the axis of the propeller or otherwise as corresponds with the purpose of the invention.

Figure 6:
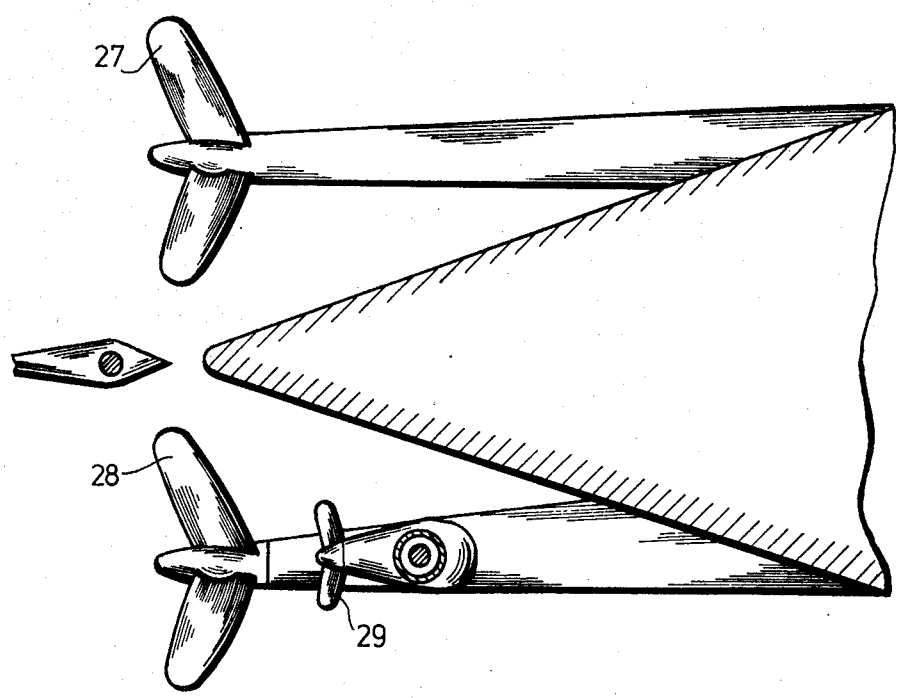
FIG. 6 illustrates a ship according to the invention having two main propellers of which only one has a supplemental propeller associated with it.

FIG. 6 illustrates schematically the rear of a twin-screw ship, in which a supplemental propeller 29 is not associated with both main propellers 27, 28 but with only one of them.

Although a particular preferred embodiment of the invention has been disclosed in detail for illustration purposes, it will be recognized that variations or modifications of the disclosed apparatus, including the rearrangement of parts, lie within the scope of the present invention.

The embodiments of the invention in which an exclusive property or privilege is claimed are defined as follows:

1. A watercraft, comprising:
   hull means;
   at least one main thrust propeller for said watercraft rotatably mounted at the stern of said hull means about a first fixed axis of rotation;
   first drive means for driving said main propeller;
   housing means pivotally mounted for movement about a vertical pivot axis at said stern of said hull means and in front of said main propeller;
   a secondary propeller rotatably mounted on said housing means about a second axis of rotation fixed in said housing means, said second axis of rotation being located in a plane above said first axis of rotation;
   second drive means for driving said secondary propeller independently of said first drive means; and
   each of said main and secondary propellers defining a circle at the tips of the blades thereof on rotation thereof and when said second axis of rotation is moved to become coplanar with said first axis of rotation and when said main and secondary propellers are viewed from a plane perpendicular to one of said first and second axes of rotation, said circles at least partly overlap, the distance between said circles measured in a direction parallel to the longitudinal axis of said watercraft being at least three-fourths (0.75) of the diameter of the circle of said second propeller.

2. A watercraft according to claim 1, wherein said vertical pivot axis for said housing means is contained in a central plane containing the central longitudinal axis for said watercraft; and
   wherein said first axis of rotation is oriented at an angle to said central plane to generate a moment about a second vertical axis contained in said central plane for counteracting another moment about said second vertical axis caused by the torque of said main propeller.

3. A watercraft according to claim 2, wherein the center of said main propeller defined by the point of intersection between a plane containing said tips of said blades and said first axis of rotation is laterally offset from said central plane.

4. A watercraft accroding to claim 2, wherein the center of said main propeller defined by the point of intersection between a plane containing said tips of said blades and said first axis of rotation is contained in said central plane.

5. A watercraft according to claim 1, wherein said vertical pivot axis for said housing means is contained in a central plane containing the central longitudinal axis for said watercraft;
   wherein said first axis of rotation is parallel to said central plane; and
   wherein the center of said main propeller defined by the point of intersection between the plane containing said tips of said blades and said first axis of rotation is laterally offset from said central plane.

6. A watercraft according to claim 1, wherein said hull means includes a counter surface above at least said secondary propeller; and
   wherein the vertical spacing between said counter surface and the upper part of said circle for said secondary propeller is less than 15% of the diameter of said main propeller.

7. A watercraft, comprising:
   hull means;
   a pair of main thrust propellers for said watercraft rotatably mounted at the stern of said hull means about first fixed axes of rotation and on opposite sides of a central plane containing the central longitudinal axis for said watercraft;
   first drive means for driving said pair of main thrust propellers;
   housing means pivotally mounted for movement about a vertical pivot axis at said stern of said hull means, said vertical pivot axis being located on one side of said central plane and in front of the one main propeller on said one side of said central plane;
   a secondary propeller rotatably mounted on said housing means about a second axis of rotation fixed in said housing means, said second axis of rotation being located in a plane above said first axis of rotation on said one side of said central plane;
   second drive means for driving said secondary propeller independently of said first drive means; and
   each of said one main propeller and said secondary propeller defining a circle at the tips of the blades thereof on rotation thereof and when said second axis of rotation is moved to become coplanar with said first axis of rotation on said one side of said central plane and when said one main propeller and said secondary propeller are viewed from a plane perpendicular to one of said first axis of rotation on said one side of said central plane and said second axis of rotation, said circles at least partly overlap, the distance between said circles measured in a direction parallel to the longitudinal axis of said watercraft being at least three-fourths (0.75) of the distance of the circle of said second propeller.

* * * * *